US 8,638,572 B2

(12) United States Patent
Djenguerian et al.

(10) Patent No.: US 8,638,572 B2
(45) Date of Patent: *Jan. 28, 2014

(54) APPARATUS AND METHOD FOR DETECTING A CHANGE IN OUTPUT VOLTAGE OF AN ISOLATED POWER CONVERTER

(71) Applicant: Power Integrations, Inc., San Jose, CA (US)

(72) Inventors: Alex B. Djenguerian, Saratoga, CA (US); Arthur B. Odell, Morgan Hill, CA (US); Henson Wu, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,197

(22) Filed: Nov. 19, 2012

(65) Prior Publication Data

US 2013/0077355 A1 Mar. 28, 2013

Related U.S. Application Data

(63) Continuation of application No. 13/293,042, filed on Nov. 9, 2011, now Pat. No. 8,339,811, which is a continuation of application No. 12/770,500, filed on Apr. 29, 2010, now Pat. No. 8,077,484.

(51) Int. Cl.
*H02M 3/335* (2006.01)

(52) U.S. Cl.
USPC .................................... 363/21.01; 363/97

(58) Field of Classification Search
USPC ............. 363/20, 21.01, 21.02, 74, 78, 95, 97, 363/131
See application file for complete search history.

(56) References Cited

U.S. PATENT DOCUMENTS

| | | | |
|---|---|---|---|
| 4,969,081 A | 11/1990 | Shekhawat et al. | |
| 5,351,179 A | 9/1994 | Tsai et al. | |
| 5,424,933 A | 6/1995 | Illingworth | |
| 5,754,414 A | 5/1998 | Hanington | |
| 5,903,452 A | 5/1999 | Yang | |
| 6,078,509 A | 6/2000 | Jacobs et al. | |
| 6,580,624 B2 | 6/2003 | Arai | |
| 7,061,778 B2 | 6/2006 | Odell et al. | |
| 7,209,371 B2 | 4/2007 | Odell et al. | |
| 7,394,670 B2 | 7/2008 | Koike | |
| 7,403,402 B2 | 7/2008 | Odell et al. | |
| 8,077,484 B2 | 12/2011 | Djenguerian et al. | |
| 8,339,811 B2 * | 12/2012 | Djenguerian et al. | ..... 363/21.01 |
| 2001/0005322 A1 | 6/2001 | Uchida | |
| 2005/0259448 A1 | 11/2005 | Koike | |
| 2009/0180302 A1 | 7/2009 | Kawabe et al. | |
| 2011/0013438 A1 | 1/2011 | Frisch et al. | |

* cited by examiner

*Primary Examiner* — Adolf Berhane
(74) *Attorney, Agent, or Firm* — Blakely Sokoloff Taylor & Zafman LLP

(57) ABSTRACT

A power converter controller includes a drive circuit coupled to control switching of a power switch coupled to an energy transfer element and an input of the power converter. An output voltage sensor including first and second pulse sampler circuits is coupled to capture first and second peak voltages, respectively, that are representative of a second peak of a ringing voltage of a feedback signal representative of an output of the power converter. The first pulse sampler circuit is coupled to capture the first peak voltage at a first time in the feedback signal. The second pulse sampler circuit is coupled to capture the second peak voltage at a second time in the feedback signal. The drive circuit is coupled to receive a change signal from the output voltage sensor in response to the first and second peak voltages.

9 Claims, 4 Drawing Sheets

US 8,638,572 B2

APPARATUS AND METHOD FOR DETECTING A CHANGE IN OUTPUT VOLTAGE OF AN ISOLATED POWER CONVERTER

REFERENCE TO PRIOR APPLICATION(S)

This is a continuation of U.S. patent application Ser. No. 13/293,042, filed Nov. 9, 2011, now pending, which is a continuation of U.S. patent application Ser. No. 12/770,500, filed Apr. 29, 2010, now U.S. Pat. No. 8,077,484. U.S. patent application Ser. No. 13/293,042 and U.S. Pat. No. 8,077,484 are hereby incorporated by reference.

BACKGROUND INFORMATION

1. Field of the Disclosure

The present invention relates generally to detecting a change of an output voltage of an isolated power converter, and more specifically, the invention relates to sensing a ringing voltage from a bias winding of an isolated power converter to detect a change in output voltage.

2. Background

Many electrical devices such as cell phones, personal digital assistants (PDA's), laptops, etc. are powered by a source of relatively low-voltage dc power. Power is typically delivered through a wall outlet as high-voltage ac power. A device generally referred to as a switching power converter is typically used to transform the high-voltage ac power to low-voltage dc power. In certain applications, electrical devices may require a constant output voltage and/or a minimum operating voltage delivered from a power converter. In operation, a power converter may use a controller to control a switch that transfers energy from the input side to the output side of the power converter in order to maintain a constant voltage at the output of the power converter.

One characteristic of a power converter may be that it provides galvanic isolation between the input and the output of the power converter, meaning there is no dc current path to allow current to flow from the input side to the output side of the power converter. In one example, a power converter may include an energy transfer element such as a coupled inductor that galvanically isolates the input side from the output side of the power converter. During operation, a power converter may regulate the output voltage at the output of the power converter by using a controller that is coupled to a sensor to provide feedback from the output of the power converter in order to regulate the output voltage. More specifically, the controller may regulate output voltage at the output of the power converter by controlling a switch to turn on and off in response to the feedback information from the sensor to transfer energy pulses through the isolation element to the output from a source of input power such as a power line.

One type of power converter may be a primary side control power converter. This type of power converter uses a feedback mechanism that is indirectly coupled to the output side of a galvanically isolated power converter. In one example, a primary side control power converter may use a bias winding that is magnetically coupled to the output winding to sense an output voltage.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for detecting a change in an output voltage of an isolated output of a power converter are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
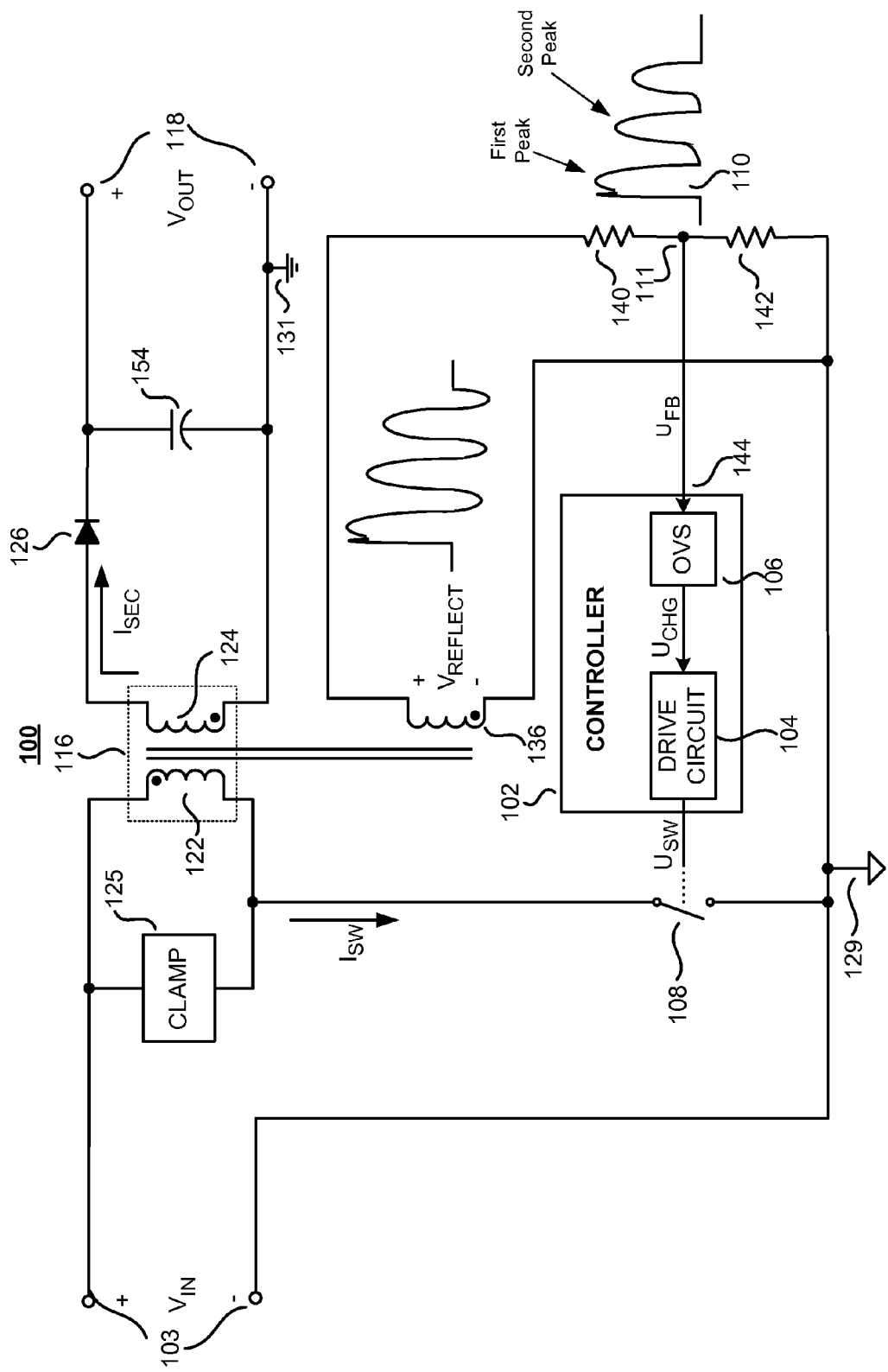
FIG. 1 is a schematic showing generally an example of a power converter including a controller that includes a drive circuit and output voltage sensor (OVS) in accordance with the teachings of the present invention.

FIG. 1 is a schematic showing generally an example of a power converter 100, which may also be referred to as a power supply, including a controller 102 that includes a drive circuit 104 and output voltage sensor (OVS) 106 in accordance with the teachings of the present invention. In one example, controller 102 may be included in an integrated circuit. As shown, the power converter 100 receives dc input voltage $V_{IN}$ at input terminals 103. An energy transfer element 116 is coupled between input terminals 103 and output terminals 118 of the power converter 100. In the example, energy transfer element 116 galvanically isolates input terminals 103 from output terminals 118, which maintains an output voltage $V_{OUT}$. With input terminals 103 galvanically isolated from output terminals 118 by energy transfer element 116, there is no dc current path to allow current to flow from the input side to the output side of the power converter 100. As shown, an input return 129 is reference to an input side coupled to input terminals 103 and an output return 131 is reference to an output side coupled to output terminals 118. In one example, energy transfer element 116 includes an input winding 122 and an output winding 124. An "input winding" may also be referred to as a "primary winding" and an "output winding" may also be referred to as a "secondary winding." As shown, a clamp circuit 125 is coupled to input winding 122 of energy transfer element 116 to limit the maximum voltage across a power switch 108 coupled to input winding 122.

As shown in the depicted example, controller 102 is coupled to power switch 108, which is coupled to input winding 122 and an input return 129. In one example, power switch 108 and controller 102 may be integrated in the same monolithic device. In another example, power switch 108 may be a discrete switch packaged with an integrated controller 102 in a hybrid device. In operation, power switch 108 is coupled to control the transfer of energy through the energy transfer element 116 from input terminals 103 to the output terminals 118 to regulate an output of power converter 100 by switching the power switch 108 between an on state and an off state. More specifically, when power switch 108 is on, a switch current $I_{SW}$ flows through the input winding 122 and when power switch 108 is off, switch current $I_{SW}$ is substantially prevented from flowing through power switch 108. In one example, power switch 108 is a transistor, such as for example a high voltage metal oxide semiconductor field effect transistor (MOSFET). In other various examples, controller 102 may include features to employ any of a variety of regulation methods including, but not limited to, ON/OFF control, ON/OFF control with varying current limit levels, pulse width modulation (PWM), or the like.

In one example, the energy transfer element 116 further includes a bias winding 136 that provides a reflected voltage $V_{REFLECT}$, which may be representative of output voltage $V_{OUT}$ when an output rectifier 126 conducts and allows a secondary current $I_{SEC}$ to flow through output winding 124. In one example, reflected voltage $V_{REFLECT}$ may be representative of output voltage $V_{OUT}$ during at least a portion of the time when the power switch 108 is off. As shown, at node 111 a ringing voltage 110 may be an altered version of reflected voltage $V_{REFLECT}$. As shown, ringing voltage 110 at node 11 is clamped to stay positive by controller 102. More specifically, when the reflected voltage $V_{REFLECT}$ becomes negative, the voltage at node 111 is clamped to substantially zero by forward biasing a diode substrate in controller 102, and when the reflected voltage $V_{REFLECT}$ becomes positive, the voltage and node 111 follows the reflected voltage minus a dc voltage offset.

In one example, when power switch 108 transitions from an on state to an off state, switch current $I_{SWITCH}$ is substantially prevented from flowing through power switch 108 and the energy stored in input winding 122 is transferred to output winding 124 providing a reflected voltage $V_{REFLECT}$ that is representative of the output voltage $V_{OUT}$. Portions of the reflected voltage $V_{REFLECT}$ may be proportional to the output voltage $V_{OUT}$ by the same proportion of the number of turns in bias winding 136 to the number of turns in output winding 124. Bias winding 136 may sometimes also be referred to as an "auxiliary" winding.

During a no-load condition, which occurs for example when substantially no energy is drawn by a load coupled to the output terminals 118, the energy delivered to the output side of power converter 100 may be minimal, thus reducing the conduction time of output rectifier 126. In one example, during a short conduction time of output rectifier 126, parasitic elements such as leakage inductance and other parasitics caused by components coupled to energy transfer element 116 may be generated during the entire duration of the 'first' peak of ringing voltage 110. As a consequence, the 'first' peak of ringing voltage 110 may have a significant component of distortion. In accordance with the teachings of the present invention, a sampling of a 'second' peak of ringing voltage 110, which in one example may have less distortion, may provide a more accurate representation of the output voltage $V_{OUT}$. In an alternative embodiment, a sampling of a 'third', 'fourth', or any subsequent peak may be sampled in accordance with the teachings of the present invention.

Continuing with the example shown in FIG. 1, bias winding 136 is coupled to a voltage divider that includes first and second resistors 140 and 142 such that a feedback terminal 144 of controller 102 is coupled to node 111 between first and second resistors 140 and 142. In one example, values for first and second resistors 140 and 142 may be chosen to set the desired output voltage $V_{OUT}$. A feedback signal $U_{FB}$ is received by output voltage sensor OVS 106 of controller 102 and receives ringing voltage 110 when power switch 108 is turned off.

In operation, controller 102 produces pulsating currents in the output rectifier 126, which in the illustrated example includes a diode that is filtered by capacitor 154 to produce the substantially constant output voltage $V_{OUT}$. In operation, output voltage sensor OVS 106 senses a 'second' peak of ringing voltage 110 to determine a change in output voltage $V_{OUT}$. In one example, output voltage sensor 106 may not be used to regulate output voltage $V_{OUT}$, but may be used to determine a significant change in output voltage $V_{OUT}$ during a transition from a no-load condition to a load condition at output terminals 118 in accordance with the teachings of the present invention. It may be appreciated that controller 102 may include additional known circuitry (not shown) other than output voltage sensor OVS 106 to regulate output voltage $V_{OUT}$ to a substantially constant output voltage $V_{OUT}$ when output terminals 118 are loaded. In another example, output voltage sensor OVS 106 may also be used to regulate output voltage $V_{OUT}$. As further shown, drive circuit 104 is coupled to receive a change signal $U_{CHG}$ from output voltage sensor 106, which may indicate a change of output voltage $V_{OUT}$. In turn, drive circuit 104 of controller 102 may respond by outputting a switching signal $U_{SW}$ that switches power switch 108 in a manner to increase delivery of power to help prevent the output voltage $V_{OUT}$ from falling below a minimum output voltage required by the load.

Figure 2:
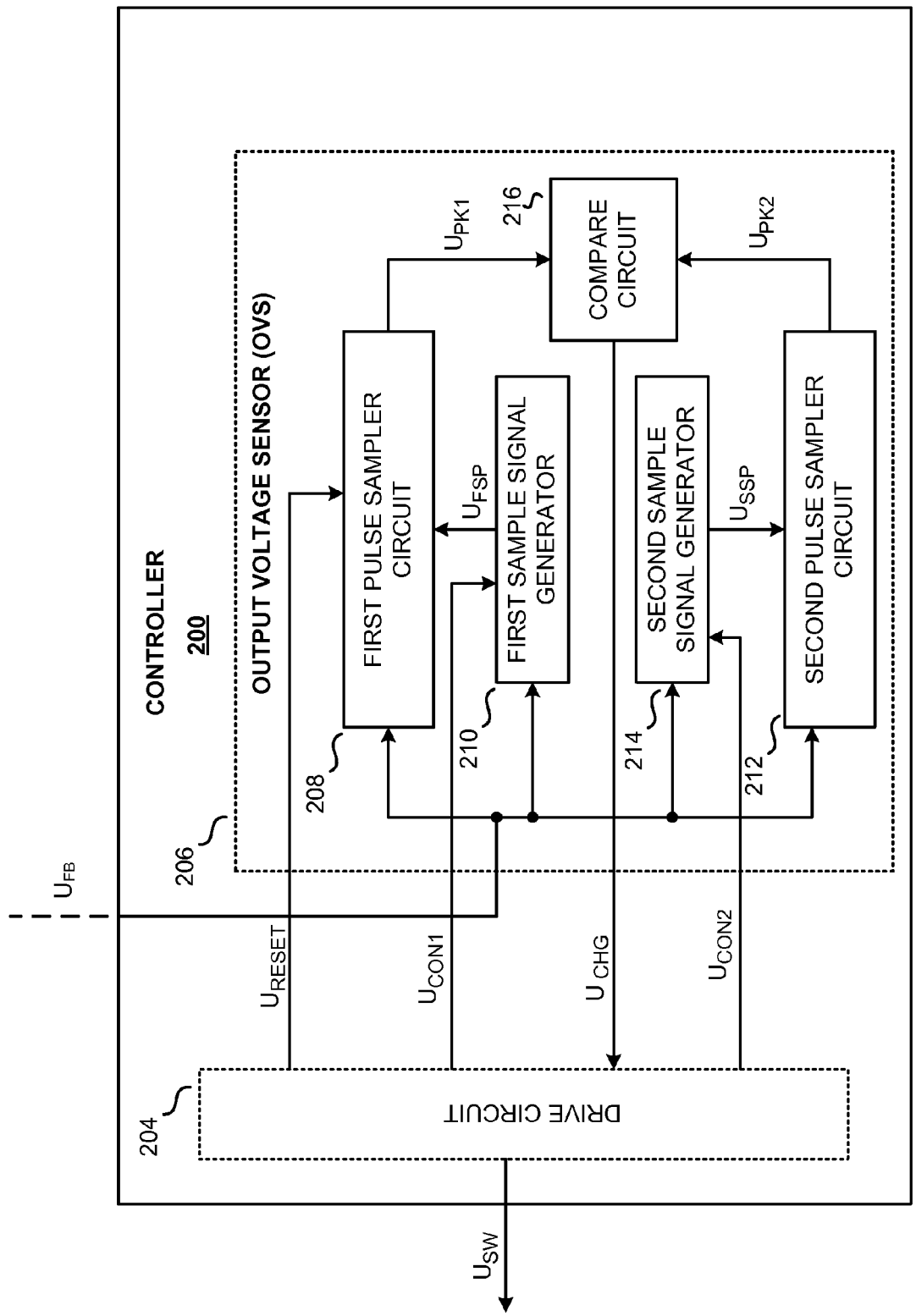
FIG. 2 is a block diagram further illustrating an example controller in accordance with the teachings of the present invention.

FIG. 2 is a block diagram further illustrating generally an example controller 200 in accordance with the teachings of the present invention. In one example, controller 200 may replace controller 102 in FIG. 1. As shown, controller 200 includes drive circuit 204 and output voltage sensor (OVS) 206. As further shown, output voltage sensor 206 may receive a feedback signal $U_{FB}$ from a bias winding, such as for example bias winding 136 shown in FIG. 1. In one example, feedback signal $U_{FB}$ includes a ringing voltage 110 of a decaying oscillation representative of an output voltage $V_{OUT}$ of a power converter. In operation, output voltage sensor 206 outputs an output voltage change signal $U_{CHG}$ in response to feedback signal $U_{FB}$. A drive circuit 204 is coupled to output voltage sensor 206 and in response to signal $U_{CHG}$, outputs a switching signal to help prevent an output voltage of a power converter from dropping too low.

As shown in the example depicted in FIG. 2, output voltage sensor 206 includes a first pulse sampler circuit 208, a first sample signal generator 210, a second pulse sampler circuit 212, a second sample signal generator 214 and a compare circuit 216 coupled together as shown. In operation, output voltage sensor is used to detect when a change in the output voltage $V_{OUT}$ occurs. To illustrate, first sample signal generator 210 is coupled to receive a control signal $U_{CON1}$ from drive circuit 204 to initiate a first sampling of feedback signal $U_{FB}$, which is representative of the output voltage $V_{OUT}$. In operation, drive circuit 204 generates control signal $U_{CON1}$, which initiates a process of detecting when there is a change in feedback signal $U_{FB}$. In one example, control signal $U_{CON1}$ is generated when a power converter first transitions from a load condition to a no load condition where minimal energy is being transferred to the output of the power converter. In operation, first sample signal generator 210 outputs a first sample pulse signal $U_{FSP}$ to first pulse sampler circuit 208 that samples over a window to capture a first peak voltage representative of the 'second' peak of ringing voltage 110 at a first time in the feedback signal $U_{FB}$, shown in FIG. 1. As shown, first pulse sampler circuit 208 captures the first peak voltage representative of the 'second' peak of a ringing voltage 110 in feedback signal $U_{FB}$ in response to first sample pulse signal $U_{FSP}$. In operation, first pulse sampler circuit outputs the first peak voltage signal $U_{PK1}$ that is representative of a peak voltage of a 'second' peak of a ringing voltage 110 at a first time in feedback signal $U_{FB}$.

Similarly, second sample signal generator 214, receives a control signal $U_{CON2}$ from drive circuit 204 to initiate a second sampling of feedback signal $U_{FB}$. In operation, drive circuit 204 generates control signal $U_{CON2}$ to detect if feedback signal $U_{FB}$ has changed relative to the time when feedback signal $U_{FB}$ was previously captured in response to control signal $U_{CON1}$. In one example, control signal $U_{CON2}$ is generated when, a controller of power converter would like to compare feedback conditions of the output voltage $V_{OUT}$ from an initial state with a present state to detect when the present state deviates from the initial state, such as during, a transition from a no-load condition to a load condition. In operation, second sample signal generator 214 outputs a second sample pulse signal $U_{SSP}$ to second sample signal generator 214 that samples over a window to capture a second peak voltage representative of the 'second' peak of the ringing voltage 110 at a second time in the feedback signal $U_{FB}$, shown in FIG. 1. As shown, second pulse sampler circuit 212 captures the second peak voltage representative of the 'second' peak of the ringing voltage 110 in feedback signal $U_{FB}$ in response to second sample pulse signal $U_{SSP}$. In operation, second pulse sampler circuit 212 outputs the second peak voltage signal $U_{PK2}$ that is representative of the peak voltage of a 'second' peak of a ringing voltage 110 at a second time in feedback signal $U_{FB}$.

As shown, compare circuit 216 is coupled to receive first peak voltage signal $U_{PK1}$, which is representative of the peak voltage of a 'second' peak of a ringing voltage 110 at a first time in feedback signal $U_{FB}$. Compare circuit 216 is also coupled to receive the second peak voltage signal $U_{PK2}$, which is representative of the peak voltage of a 'second' peak of a ringing voltage 110 at a second time in feedback signal $U_{FB}$. In operation, compare circuit 216 outputs a voltage change signal $U_{CHG}$ in response to peak voltage signal $U_{PK1}$ and a peak voltage signal $U_{PK2}$. In one example, compare circuit 216 compares peak voltage signals $U_{PK1}$ with $U_{PK2}$ to determine if there is change in output voltage $V_{OUT}$. In the illustrated example, a reset signal $U_{RESET}$ is received by first pulse sampler circuit 208 to reset first peak voltage signal $U_{PK1}$ to an initial value, such as zero. In operation, reset signal $U_{RESET}$ is output by drive circuit 204 before feedback signal $U_{FB}$ can be sampled by first pulse sampler circuit 208. In one example, reset signal $U_{RESET}$ may be output in response to output voltage change $U_{CHG}$ signal to reset the initial conditions of output voltage sensor 206.

Figure 3:
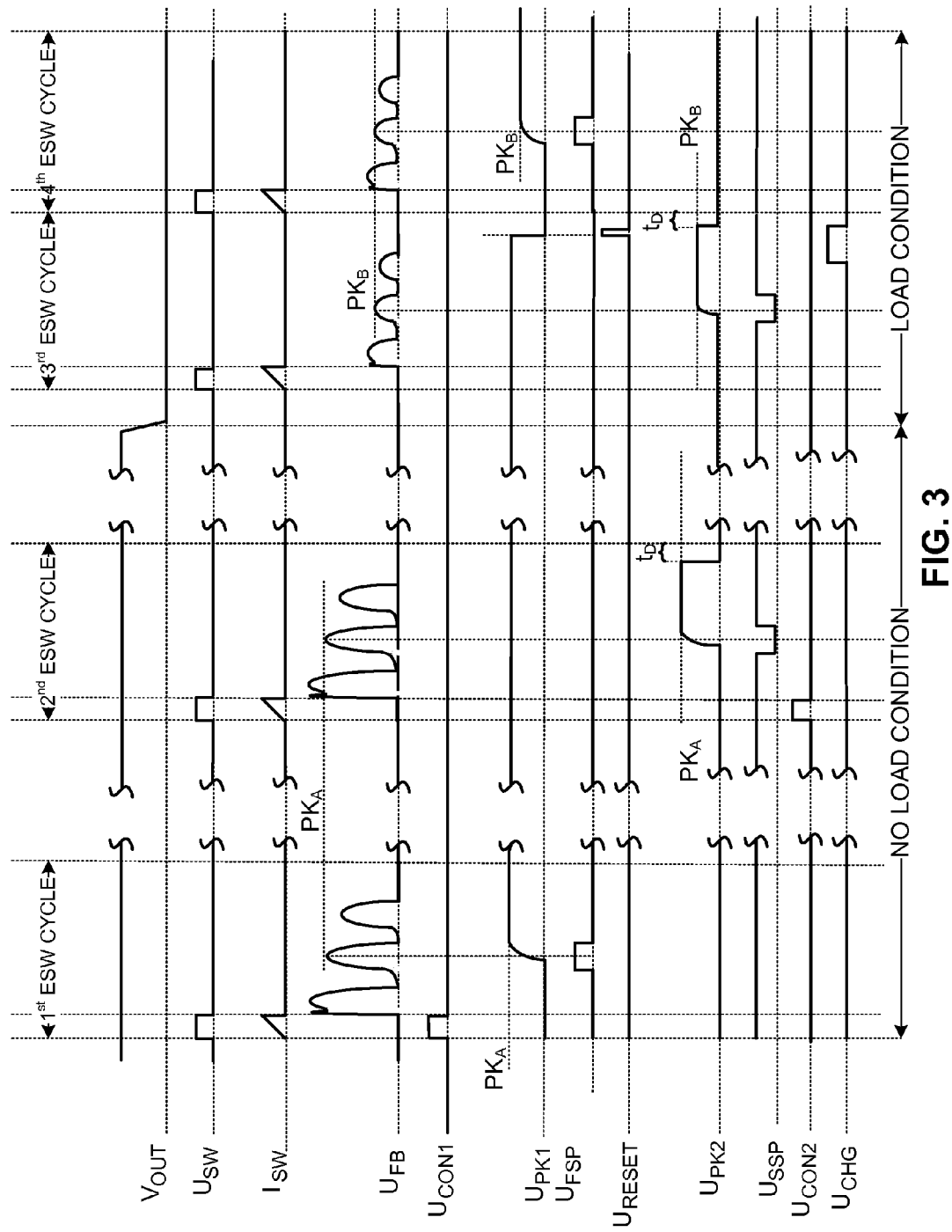
FIG. 3 illustrates example waveforms of signals in an example controller in accordance with the teachings of the present invention.

FIG. 3 illustrates example waveforms of signals in an example controller 200 in accordance with the teachings of the present invention. As shown, four 'enabled' switching cycles ("ESW") of a power converter are shown. For purposes of this disclosure, an enabled switching cycle may be defined as a cycle where switching of power switch 108 has occurred to deliver power to the output of power converter 100. As shown in FIG. 3, in the first enabled switching cycle $1^{st}$ ESW CYCLE, a drive signal $U_{SW}$ is allowing power switch 108 to conduct for only a portion of the total switching cycle $1^{st}$ ESW CYCLE. This may result in only a small amount of power being transferred to the output of the power converter 100 during the $1^{st}$ ESW CYCLE. As shown, a switch current $I_{SW}$ is representative of the current through power switch 108 during an on state. In one example, switch current $I_{SW}$ is limited to a specified value. A feedback signal $U_{FB}$ shows a ringing voltage 110 at node 111 occurring after power switch 108 is disabled, and energy is transferred to secondary winding 124. As further shown, first peak voltage signal $U_{PK1}$ is representative of a peak voltage $PK_A$ of the 'second' peak of ringing voltage during the first enabled switching cycle $1^{st}$ ESW CYCLE. As further shown, first sample pulse signal $U_{FSP}$ is a low signal during the duration of the 'second' peak of ringing voltage during the first enabled switching cycle $1^{st}$ ESW CYCLE. In one example, first sample pulse signal $U_{FSP}$ allows sampling of feedback signal $U_{FB}$ when first sample pulse signal $U_{FSP}$ is a low value.

A second peak voltage signal $U_{PK2}$ is representative of a peak voltage $PK_A$ of the 'second' peak of the ringing voltage of feedback signal $U_{FB}$ during a second enabled switching cycle $2^{nd}$ ESW CYCLE. In one example, second peak voltage signal $U_{PK2}$ is reset after a certain time delay $t_D$ such that subsequent voltage rings may be sampled. As further shown, second sample pulse signal $U_{SSP}$ is a low signal during the duration of the 'second' peak of ringing voltage of the $2^{nd}$ ESW CYCLE.

As shown in the illustrated example, there has been no detectable change in output voltage when comparing the value of the 'second' peak of ringing voltage in the first enabled switching cycle $1^{st}$ EWS CYCLE with the value of the 'second' peak of ringing voltage in the second enabled switching cycle $2^{nd}$ ESW CYCLE. Thus, in this example, the voltage change signal $U_{CHG}$ output from compare circuit 216 of FIG. 2 is not changed between first and second enabled switching cycles. As shown, between the first enable switching cycle $1^{st}$ EWS CYCLE and second enable switching cycle $2^{nd}$ EWS CYCLE, there may be several 'disabled' switching cycles in between. This may occur due to a NO LOAD CONDITION, as illustrated in FIG. 3 where very little power is required to be delivered to the output.

As further shown in the example depicted in FIG. 3, several 'disabled' switching cycles may occur between second enabled switching cycle $2^{nd}$ EWS CYCLE and third enabled switching cycle $3^{rd}$ EWS CYCLE. As shown in the example, the output voltage $V_{OUT}$ drops significantly in a short time right before the third enabled switching cycle $3^{rd}$ EWS CYCLE. In the example, this may possibly indicate a change from a no load condition to a load condition as output voltage $V_{OUT}$ drops. During the example third enabled switching cycle $3^{rd}$ EWS CYCLE illustrated in FIG. 3, the second peak voltage signal $U_{PK2}$ is representative of peak voltage $PK_B$. At this point, when first and second peak voltage signals $UPK_1$, which is representative of voltage $PK_A$, and $U_{PK2}$, which is now representative of voltage $PK_B$, are compared with each other, a difference is determined. Accordingly, the $U_{CHG}$ signal output from compare circuit 216 of FIG. 2 is changed to indicate to the drive circuit 204 that the output voltage $V_{OUT}$ of power converter 100 has changed. In this manner, controller 102 may determine a change in output voltage $V_{OUT}$ of power converter 100 has occurred and may adjust the delivery of energy to the output of the power converter in accordance with the teachings of the present invention.

Figure 4:
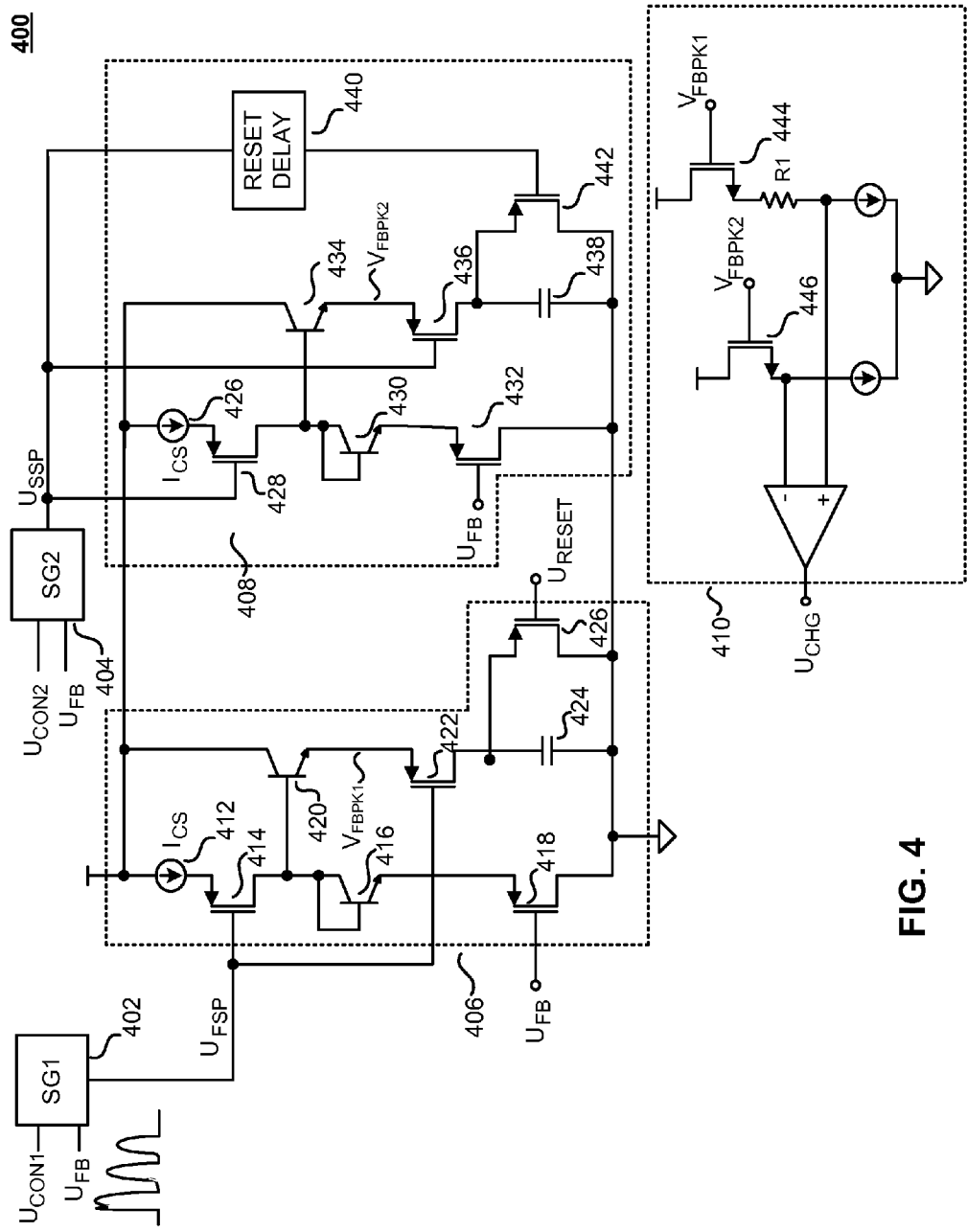
FIG. 4 illustrates generally a schematic of an example output voltage sensor in accordance with the teachings of the present invention.

FIG. 4 illustrates generally a schematic of an example output voltage sensor in accordance with the teachings of the present invention. In one example, output voltage sensor 400 may replaced output voltage sensor 106 in FIG. 1 or output voltage sensor 206 in FIG. 2. As shown, output voltage sensor 400 includes a first sample signal generator SG1 402, a second sample signal generator SG2 404, a first pulse sampler circuit 406, a second pulse sampler circuit 408, and a compare circuit 410. As shown in the depicted example, first pulse sampler circuit 406 includes a current source 412 coupled to a first p-channel transistor 414. In operation, when first sample pulse signal $U_{FSP}$ goes low, transistor 414 turns on and allows a constant current $I_{CS}$ from current source 412 to pass through transistor 414 and a bipolar junction transistor 416 and a p-channel transistor 418. As shown, the gate of transistor 418 receives feedback signal $U_{FB}$ to control the voltage at the source of transistor 418. As further shown, a bipolar junction transistor 420 is coupled to the base of transistor 416 such that the voltage at the emitter of transistor 420 essentially follows the voltage at the emitter of transistor 416, which is representative of the voltage of feedback signal $U_{FB}$ at the gate of transistor 418. The voltage at the emitter of transistor 416 is the sum of voltage of feedback signal $U_{FB}$ and a gate to source voltage of p-channel transistor 418.

In operation, first sample signal generator SG1 402 initiates a count upon receiving control signal $U_{CON1}$ and after it reaches a predetermined count, first sample signal generator SG1 402 outputs first sample pulse signal $U_{FSP}$. Due to certain design parameters of a power converter, first sample signal generator SG1 402 may be designed to have a certain count such that first sample pulse $U_{FSP}$ is generated during the second peak of the ringing voltage in feedback signal $U_{FB}$. In one example, first sample signal generator SG1 402 may be set to a different count due to different design parameters of the power converter such that first sample pulse $U_{FSP}$ is generated during the second peak of the ringing voltage in feedback signal $U_{FB}$. In operation, first sample pulse signal $U_{FSP}$ is received by transistors 414 and 422 to allow for sampling of the 'second' peak of the ringing voltage. When first sample pulse signal $U_{FSP}$ goes low, capacitor 424 charges to a peak voltage of the 'second' peak of the ringing voltage in feedback signal $U_{FB}$. When transistor 422 turns off, capacitor 424 stores the peak voltage of the 'second' peak of the ringing voltage in feedback signal $U_{FB}$.

In operation, second sample signal generator SG2 404 initiates a count upon receiving second control signal $U_{CON2}$ and after it reaches a predetermined count, second sample signal generator SG2 404 outputs second sample pulse signal $U_{SSP}$. Due to certain design parameters of a power converter, second sample signal generator SG2 404 may be designed to have a certain count such that second sample pulse $U_{SSP}$ is generated during the second peak of the ringing voltage in feedback signal $U_{FB}$. In one example, second sample signal generator SG2 404 may be set to a different count due to different design parameters of the power converter such that second sample pulse $U_{SSP}$ is generated during the second peak of the ringing voltage in feedback signal $U_{FB}$. As shown, second pulse sampler circuit 408 includes a current source 426 coupled to a p-channel transistor 428. In operation, when second sample pulse signal $U_{SSP}$ goes low, transistor 428 turns on and allows a current to pass through transistor 428 and a bipolar junction transistor 430 and a p-channel transistor 432. As shown, the gate of transistor 432 receives feedback signal $U_{FB}$ to control the voltage at the source of transistor 432. As further shown, a bipolar junction transistor 434 is coupled to the base of transistor 430 such that the voltage at the emitter of transistor 434 essentially follows the voltage at the emitter of transistor 430, which is representative of the feedback signal $U_{FB}$ at the gate of transistor 432. The voltage at the emitter of transistor 430 is the sum of voltage of feedback signal $U_{FB}$ and a gate to source voltage of p-channel transistor 432.

In operation, second sample pulse signal $U_{SSP}$ is received by transistors 428 and 436 to allow for sampling of the 'second' peak of the ringing voltage. When second sample pulse signal $U_{FSP}$ goes low capacitor 438 charges to a peak voltage of the 'second' peak of the ringing voltage in feedback voltage $U_{FB}$. When transistor 436 turns off, capacitor 438 stores the peak voltage of the 'second' peak of the ringing voltage in feedback voltage $U_{FB}$. In the illustrated example, capacitor 438 is reset after a predetermined time delay $t_D$ set by reset circuit 440 and an n-channel transistor 442 to receive subsequent feedback voltage samples. In one example, the sizes of all components in first pulse sampler circuit 406 are substantially identical to the sizes of the respective components in second pulse sampler circuit 408.

In one example, first pulse sample circuit 406 may sample an output voltage at an initial condition, and second pulse sample circuit 408 may sample output voltage periodically to determine if there is change in output voltage from the initial condition. As shown, compare circuit 410 receives a voltage $V_{FBPK1}$, which is representative of a peak voltage sampled by first pulse sampler circuit 406 at the gate of an n channel transistor 444. Compare circuit 410 also receives a voltage $V_{FBPK2}$, which representative of a peak voltage sampled by second pulse sampler circuit 408 at the gate of an n-channel transistor 446.

In operation, a comparator 448 outputs a $U_{CHG}$ voltage change signal, which is coupled to be received by drive circuit 104 of FIG. 1 or drive circuit 204 of FIG. 2, in response to a voltage representative of $V_{FBPK1}$ at the source of transistor 444 and $V_{FBPK2}$ at the source of transistor 446. In one example, $U_{CHG}$ indicates that there has been a significant change in output voltage if the difference between $V_{FBPK1}$ and $V_{FBPK2}$ is greater than a threshold value, as determined by the voltage across resistor R1 coupled to transistor 444. As discussed above, when the $U_{CHG}$ voltage change signal indicates to the drive circuit 104 of FIG. 1 or drive circuit 204 of FIG. 2 that there has been a significant change in output voltage $V_{OUT}$, the drive circuit may then respond by outputting a switching signal $U_{SW}$ that switches power switch 108 in a manner to increase the transfer of energy through the energy transfer element 116 from the input of the power converter 100 to the output of the power converter 10 to help prevent the output voltage $V_{OUT}$ from falling below a minimum output voltage required by a load coupled to the output in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power converter controller, comprising:
a drive circuit coupled to control switching of a power switch coupled to an energy transfer element and an input of the power converter to control a transfer of energy from the input of the power converter to an output of the power converter; and
an output voltage sensor including first and second pulse sampler circuits coupled to capture first and second peak voltages, respectively, that are representative of a second peak of a ringing voltage of a feedback signal representative of the output of the power converter, wherein the first pulse sampler circuit is coupled to capture the first peak voltage at a first time in the feedback signal, wherein the second pulse sampler circuit is coupled to capture the second peak voltage at a second time in the feedback signal, and wherein the drive circuit is coupled to receive a change signal from the output voltage sensor in response to the first and second peak voltages.

2. The power converter controller of claim 1 wherein the output voltage sensor further includes a compare circuit coupled to compare the first and second peak voltages, the compare circuit coupled to output the change signal to the drive circuit in response to a comparison of the first and second peak voltages.

3. The power converter controller of claim 1 wherein the output voltage sensor further includes a first sample signal generator and a second sample signal generator, wherein the first and second sample signal generators are coupled to receive first and second control signals from the drive circuit to initiate first and second samplings of the feedback signal at the first and the second times in the feedback signal, respectively, wherein the first pulse sampler circuit is coupled to capture the first peak voltage in response to the first sample signal generator, wherein the second pulse sampler circuit is coupled to capture the second peak voltage in response to the second sample signal generator.

4. The power converter controller of claim 1 wherein the feedback signal is a reflected signal representative of the output of the power supply during an off state of the power switch.

5. The power converter controller of claim 1 wherein the feedback signal is coupled to be received from a bias winding that is magnetically coupled to an output winding of the energy transfer element.

6. The power converter controller of claim 1 wherein the ringing voltage of the feedback signal is a positive ringing signal.

7. The power converter controller of claim 1 wherein the first and second pulse sampler circuits include first and second capacitors, respectively, coupled to store the first and second peak voltages, respectively.

8. The power converter controller of claim 7 wherein the second pulse sampler circuit includes a reset circuit coupled to reset the second capacitor after a predetermined time delay.

9. The power converter controller of claim 1 wherein the drive circuit is coupled to generate a switching signal responsive to the change signal and coupled to be received by the power switch to control the transfer of energy from the input of the power converter to the output of the power converter.

* * * * *